US011889131B2

(12) United States Patent
Wu et al.

(10) Patent No.: US 11,889,131 B2
(45) Date of Patent: Jan. 30, 2024

(54) VIDEO PROCESSING DEVICE, VIDEO PROCESSING METHOD, MONITOR APPARATUS, COMPUTER DEVICE, AND MEDIUM

(71) Applicant: BOE TECHNOLOGY GROUP CO., LTD., Beijing (CN)

(72) Inventors: Congrui Wu, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/773,466

(22) PCT Filed: Jul. 12, 2021

(86) PCT No.: PCT/CN2021/105715
§ 371 (c)(1),
(2) Date: Apr. 29, 2022

(87) PCT Pub. No.: WO2022/042083
PCT Pub. Date: Mar. 3, 2022

(65) Prior Publication Data
US 2022/0377390 A1 Nov. 24, 2022

(30) Foreign Application Priority Data
Aug. 31, 2020 (CN) .......................... 202010902097.0

(51) Int. Cl.
*H04N 21/2343* (2011.01)
*H04N 21/2662* (2011.01)
*H04N 5/93* (2006.01)
(52) U.S. Cl.
CPC ........... *H04N 21/2343* (2013.01); *H04N 5/93* (2013.01); *H04N 21/2662* (2013.01)

(58) Field of Classification Search
None
See application file for complete search history.

(56) References Cited

U.S. PATENT DOCUMENTS

| 5,739,867 A * | 4/1998 | Eglit .................... G09G 5/006 348/581 |
| 2003/0117382 A1 | 6/2003 | Pawlowski et al. |

(Continued)

FOREIGN PATENT DOCUMENTS

| CN | 101554047 A | 10/2009 |
| CN | 201845537 U | 5/2011 |

(Continued)

OTHER PUBLICATIONS

China Patent Office, Second Office Action dated Jan. 5, 2023, for corresponding Chinese application 202010902097.0.

(Continued)

*Primary Examiner* — Junior O Mendoza
(74) *Attorney, Agent, or Firm* — HOUTTEMAN LAW LLC

(57) ABSTRACT

Disclosed are a video processing device, a video processing method, a monitor apparatus, a computer device, and a computer-readable medium. The video processing device includes: a receiver, a normalization processor, a selector and an image processor. The receiver is configured to receive an original video image. The normalization processor includes a plurality of normalization sub-circuits each configured to perform format adjustment on the original video image to generate a video image in a target format. Different normalization sub-circuits perform the format adjustment in different manners. The selector is configured to output the video image generated by at least one of the normalization sub-circuits to the image processor according to a received selection instruction; and the image processor (Continued)

is configured to generate an image to be displayed from the received video image.

14 Claims, 5 Drawing Sheets

(56) References Cited

U.S. PATENT DOCUMENTS

| | | |
|---|---|---|
| 2008/0088635 A1 | 4/2008 | Callway et al. |
| 2011/0216153 A1 | 9/2011 | Tasker |
| 2013/0315499 A1* | 11/2013 | Ju .................. G06T 3/4007 |
| | | 382/255 |
| 2014/0313231 A1* | 10/2014 | Wyman ............. G06T 3/0056 |
| | | 345/660 |
| 2014/0348246 A1 | 11/2014 | Fu et al. |
| 2015/0381960 A1 | 12/2015 | Han et al. |
| 2020/0245025 A1 | 7/2020 | Fogelson et al. |
| 2021/0287339 A1* | 9/2021 | Shih ..................... G06T 7/0002 |

FOREIGN PATENT DOCUMENTS

| | | |
|---|---|---|
| CN | 102783140 A | 11/2012 |
| CN | 103220550 A | 7/2013 |
| CN | 105139789 A | 12/2015 |
| CN | 105376595 A | 3/2016 |
| CN | 205751481 U | 11/2016 |
| CN | 107948733 A | 4/2018 |
| CN | 108200359 A | 6/2018 |
| CN | 111190665 A | 5/2020 |

OTHER PUBLICATIONS

China Patent Office, First Office Action dated Jun. 22, 2022, for corresponding Chinese application 202010902097.0.

* cited by examiner

VIDEO PROCESSING DEVICE, VIDEO PROCESSING METHOD, MONITOR APPARATUS, COMPUTER DEVICE, AND MEDIUM

CROSS REFERENCE TO RELATED APPLICATION

This application is a National Phase Application filed under 35 U.S.C. 371 as a national stage of PCT/CN2021/105715, filed on Jul. 12, 2021, the contents of which are incorporated herein by reference in their entirety.

TECHNICAL FIELD

The present disclosure relates to the field of display technology, and in particular relates to a video processing device, a video processing method, a monitor apparatus, a computer device, and a computer-readable medium.

BACKGROUND

In a monitor system, a video capture device (e.g., a video camera) transmits the captured video to a monitor for display so that a user may view the video captured by the video capture device. In general, the video signal input into the monitor may support a plurality of timing formats (each including a video frame rate, a resolution, a color format, etc.), while the display panel has a specific timing format. Therefore, the timing format of the video received by the monitor needs to be converted.

SUMMARY

To solve at least one of the technical problems in the existing art, the present disclosure provides a video processing device, a video processing method, a monitor apparatus, a computer device, and a computer-readable medium.

In order to achieve the above objects, the present disclosure provides a video processing device, including: a receiver, a normalization processor, a selector and an image processor; where the receiver is connected to the normalization processor, the normalization processor is connected to the selector, and the selector is connected to the image processor;

the receiver is configured to receive an original video image;

the normalization processor includes a plurality of normalization sub-circuits each configured to perform format adjustment on the original video image to generate a video image in a target format; where different normalization sub-circuits perform the format adjustment in different manners;

the selector is configured to output the video image generated by at least one of the normalization sub-circuits to the image processor according to a received selection instruction; and the image processor is configured to generate an image to be displayed from the received video image.

In some embodiments, the image processor includes: an image processing sub-circuit, an image analysis sub-circuit, a direct output sub-circuit, and a merger sub-circuit, the image processing sub-circuit, the image analysis sub-circuit, and the direct output sub-circuit are each connected to the merger sub-circuit;

the image processing sub-circuit is configured to perform image processing on the received video image to generate an optimized video image in a target format, and output the optimized video image to the merger sub-circuit;

the image analysis sub-circuit is configured to perform image analysis on the received video image to generate an analysis result image corresponding to an analysis result, and output the analysis result image to the merger sub-circuit;

the direct output sub-circuit is configured to directly output the received video image to the merger sub-circuit; and the merger sub-circuit is configured to splice the output images from the image processing sub-circuit and the direct output sub-circuit, and superimpose the spliced image with the output image from the image analysis sub-circuit to generate the image to be displayed;

where the selection instruction includes an optimization selection instruction, an analysis selection instruction and a direct output selection instruction, and the selector is specifically configured to output, in response to the optimization selection instruction, the video image generated by a corresponding normalization sub-circuit to the image processing sub-circuit; and output, in response to the analysis selection instruction, the video image generated by a corresponding normalization sub-circuit to the image analysis sub-circuit; and output, in response to the direct output selection instruction, the video image generated by a corresponding normalization sub-circuit to the direct output sub-circuit.

In some embodiments, the format adjustment performed on the original video image by the normalization sub-circuits includes resolution adjustment, and the target format includes a target resolution;

the normalization processor further includes a computation sub-circuit configured to compute the target resolution based on the received selection instruction and a parameter of a display; and a resolution of the original video image is smaller than the target resolution; and the plurality of normalization sub-circuits of the normalization processor include:

an interpolation amplification normalization sub-circuit configured to perform resolution adjustment on the original video image in an interpolation manner to obtain a first video image with the target resolution;

a boundary filling normalization sub-circuit configured to fill a periphery of the original video image with pixels of a first color in a boundary filling manner to obtain a second video image of the target resolution; and a pixel replicate normalization sub-circuit configured to, when the resolution of the original video image is M1×N1 and the target resolution is M2×N2 and if M2/M1=N2/N1=i, process the original video image in a pixel replicate manner to obtain a third video image of the target resolution, where i is an integer greater than 1; where the third video image includes N1 rows and M1 columns of pixel groups each including i rows and i columns of pixels, and a plurality of pixels of a pixel group in an $n^{th}$ row and an $m^{th}$ column are obtained by replicating a pixel in an $n^{th}$ row and an $m^{th}$ column of the original video image, where $1 \le n \le N1$ and $1 \le m \le M1$.

In some embodiments, the pixel replicate normalization sub-circuit is further configured to, if M2/M1≠N2/N1, or at least one of M2/M1 or N2/N1 is a non-integer, process the original video image in the pixel replicate manner and the boundary filling manner to obtain a fourth video image with the target resolution;

where the fourth video image includes a primary image area and a filled area, the primary image area includes N1 rows and M1 columns of pixel groups each including j rows and j columns of pixels, and a plurality of pixels of a pixel group in an $n^{th}$ row and an $m^{th}$ column are obtained by replicating the pixel in the $n^{th}$ row and the $m^{th}$ column of the original video image; and each pixel in the filled area is a pixel of a second color; where j≤min (M2/M1, N2/N1), and j is an integer.

In some embodiments, the boundary filling normalization unit is further configured to mark the pixels of the first color with which the periphery of the original video image is filled;

the pixel replicate normalization unit is further configured to mark each pixel in the filled area of the fourth video image; and the image analysis sub-circuit includes: a judgment unit and an analysis unit, where the judgment unit is configured to judge, according to markers of pixels in the video image received by the image analysis sub-circuit, whether each pixel in the received video image is an original pixel in the original video image, and take a pixel in the received video image as an effective pixel if it is judged that the pixel in the received video image is an original pixel in the original video image; and the analysis unit is configured to perform, according to data of each effective pixel, image analysis on the video image received by the image analysis sub-circuit.

In some embodiments, the video processing device further includes: a clock generator configured to output a first clock signal to the receiver and a second clock signal to each of the normalization sub-circuits;

where the receiver is configured to output, under excitation of the first clock signal, image data of the original video image to the normalization processor; and each normalization sub-circuit is configured to output, under excitation of the second clock signal, image data of the video image with the target resolution.

In some embodiments, the video processing device further includes:

a buffer connected to each of the normalization sub-circuits and configured to perform data buffering and data synchronization on the video images generated by a plurality of the normalization sub-circuits, and transmit the synchronized data to a corresponding normalization sub-circuit.

An embodiment of the present disclosure further provides a video processing method, including:

receiving an original video image;

performing format adjustment on the original video image in a plurality of different normalization processing modes to generate a plurality of video images in a target format, respectively;

selecting, according to a received selection instruction, a video image generated in at least one of the normalization processing mode; and generating an image to be displayed according to the selected video image.

In some embodiments, the generating the image to be displayed according to the selected video image includes: an optimization step, an analysis step, a direct output step and a merging step; where the optimization step includes: performing image processing on the received video image to generate an optimized video image in the target format, and providing the optimized video image for the merging step;

the analysis step includes: performing image analysis on the received video image to generate an analysis result image corresponding to a result of the analysis, and providing the analysis result image for the merging step;

the direct output step includes: directly outputting the received video image to the merger sub-circuit; and the merging step includes: splicing the video images from the optimization step and the direct output step, and superposing the spliced image with the video image from the analysis step to generate the image to be displayed;

where the selection instruction includes an optimization selection instruction, an analysis selection instruction and a direct output selection instruction; and the selecting, according to the received selection instruction, the video image generated in at least one of the normalization processing mode includes: providing, in response to the optimization selection instruction, the video image generated by a corresponding normalization sub-circuit for the image to be processed in the optimization step; and providing, in response to the analysis selection instruction, the video image generated by a corresponding normalization sub-circuit for the analysis step; and providing, in response to the direct output selection instruction, the video image generated by a corresponding normalization sub-circuit for the direct output step.

In some embodiments, the format adjustment includes resolution adjustment, the target format includes a target resolution, and a resolution of the original video image is smaller than the target resolution;

before performing format adjustment on the original video image in the plurality of different normalization processing modes, the method further includes: computing the target resolution based on the received selection instruction and a parameter of a display; and the plurality of different normalization processing modes include:

a first normalization processing mode, including: performing resolution adjustment on the original video image in an interpolation manner to obtain a first video image with the target resolution;

a second normalization processing mode, including: filling a periphery of the original video image with pixels of a first color in a boundary filling manner to obtain a second video image of the target resolution; and a third normalization processing mode, including: when the resolution of the original video image is M1×N1 and the target resolution is M2×N2 and if M2/M1=N2/N1=i, processing the original video image in a pixel replicate manner to obtain a third video image of the target resolution, where i is an integer greater than 1; where the third video image includes N1 rows and M1 columns of pixel groups each including i rows and i columns of pixels, and a plurality of pixels of a pixel group in an $n^{th}$ row and an $m^{th}$ column are obtained by replicating a pixel in an $n^{th}$ row and an $m^{th}$ column of the original video image, where 1≤n≤N1 and 1≤m≤M1.

In some embodiments, the third normalization processing mode further includes: if M2/M1≠N2/N1, or at least one of M2/M1 or N2/N1 is a non-integer, processing the original video image in the pixel replicate manner and the boundary filling manner to obtain a fourth video image with the target resolution;

where the fourth video image includes a primary image area and a filled area, the primary image area includes N1 rows and M1 columns of pixel groups each including j rows and j columns of pixels, and a plurality of pixels of a pixel group in an $n^{th}$ row and an $m^{th}$ column are obtained by replicating the pixel in the $n^{th}$ row and the $m^{th}$ column of the original video image; and each pixel in the filled area is a pixel of a second color; where j≤min (M2/M1, N2/N1), and j is an integer.

In some embodiments, the second normalization processing mode further includes: marking the pixels of the first color with which the periphery of the original video image is filled;

the third normalization processing mode further includes: marking each pixel in the filled area of the fourth video image; and the performing image analysis on the received video image includes:

judging, according to markers of pixels in the received video image, whether each pixel in the received video image is an original pixel in the original video image, and taking a pixel in the received video image as an effective pixel if it is judged that the pixel in the received video image is an original pixel in the original video image; and performing, according to data of each effective pixel, image analysis on the received video image.

An embodiment of the present disclosure further provides a monitor apparatus, including: a display and the video processing device according to any of the above embodiments, where the display is configured to perform display according to an image to be displayed output from the video processing device.

An embodiment of the present disclosure further provides a computer device, including a memory and a processor, where the memory has a computer program stored thereon which, when executed by the processor, causes the video processing method according to any of the above embodiments to be implemented.

An embodiment of the present disclosure further provides a computer-readable medium storing a computer program thereon, where the program, when executed by a processor, causes the video processing method according to any of the above embodiments to be implemented.

BRIEF DESCRIPTION OF DRAWINGS

Accompanying drawings are provided for further understanding of the present disclosure and constitute a part of the specification. Hereinafter, these drawings are intended to explain the present disclosure together with the following specific implementations, but should not be considered as a limitation to the present disclosure. In the drawings.

DETAILED DESCRIPTION

Hereinafter, specific implementations of the present disclosure will be described with respect to the accompanying drawings. It should be understood that the specific implementations as set forth herein are merely for the purpose of illustration and explanation of the present disclosure and should not be constructed as a limitation thereof.

Figure 1:
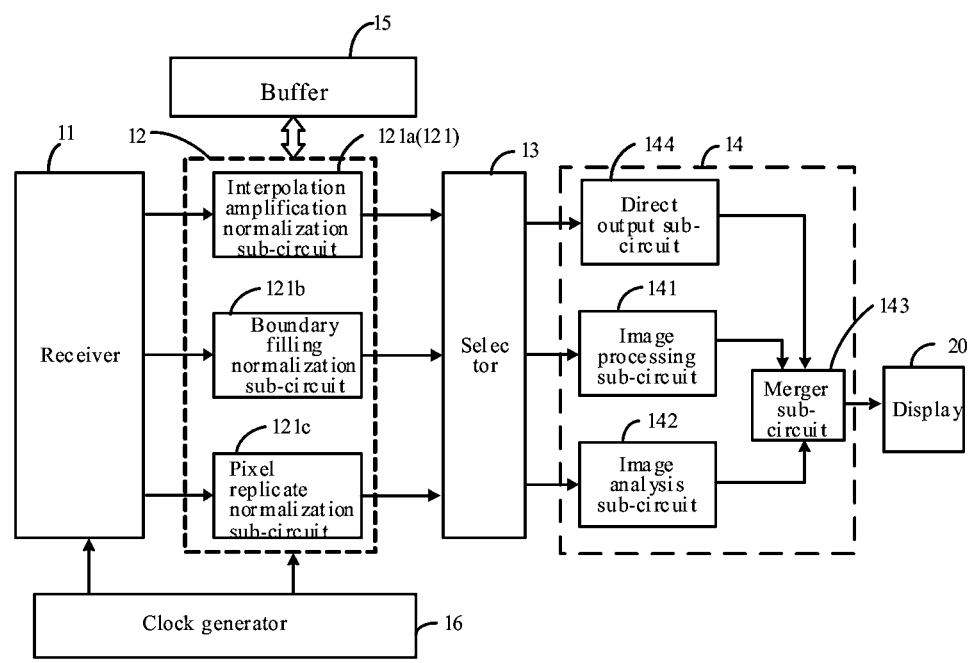
FIG. 1 is a schematic diagram of a video processing device and a display according to an embodiment of the present disclosure.

FIG. 1 is a schematic diagram of a video processing device and a display according to an embodiment of the present disclosure. The video processing device is used in a monitor apparatus for providing a video image for a display of the monitor apparatus. The video processing device includes: a receiver 11, a normalization processor 12, a selector 13 and an image processor 14.

The receiver 11 is configured to receive an original video image. The original video image may be a video image captured by a video capture device such as a video camera. In addition, the video image in the embodiments of the present disclosure refers to each frame of image in a video.

The normalization processor 12 includes a plurality of normalization sub-circuits 121 each configured to perform format adjustment on the original video image in a corresponding normalization processing mode to generate a video image in a target format, and output the video image to the selector 13. The format adjustment may include resolution adjustment, frame rate adjustment, and the like. The target format is a format matched with the display 20, and different normalization units 121 may adopt different normalization processing modes. It should be noted that, based on a same original video image, different normalization units 121 may generate video images in the target format which have substantially a same image content but different visual effects. For example, when the format adjustment is resolution adjustment, one of the normalization units 121 improves the resolution of the original video image with an interpolation method, and as a result, the video image displayed on the display better conforms to visual characteristics of human eyes. In contrast, another normalization unit 121 splices the original video image with an image of a preset color value to generate a video image of a target resolution, and as a result, the video image displayed on the display is closer to the original video image.

The selector 13 is configured to output the video image generated by at least one normalization unit 121 to the image processor 14 according to a received selection instruction. The selection instruction may be an instruction input by a user to the video processing device, and may include an optimization selection instruction. Multiple types of optimization selection instructions may be included, and the selector 13 may determine, according to a preset mapping relationship, one or more normalization sub-circuits 121 corresponding to the actually received optimization selection instruction, so as to output video images generated by the one or more normalization sub-circuits 121 to the image processor 14. The preset mapping relationship includes a correspondence relationship between a plurality of optimization selection instructions and a plurality of normalization sub-circuits 121, and each optimization selection instruction corresponds to one or more normalization sub-circuits 121.

It should be understood that when the selector does not receive a new selection instruction, selection may be made according to a last received selection instruction.

The image processor 14 is configured to generate an image to be displayed from the received video image. For example, the image processor 14 may perform image processing on the received video image to generate the image to be displayed; or may perform image processing and image analysis on the received video image, and then superpose a video image obtained after the image processing and an analysis result image obtained after the image analysis to obtain the image to be displayed.

The display 20 may include a timing control circuit (TCON) and a display panel. The TCON provides a drive signal for the display panel according to the image information of the received image to be displayed, to drive the display panel to display the image to be displayed.

In an embodiment of the present disclosure, each of the normalization units 121 may process the original video image into an image in a target format by a corresponding normalization processing mode, and the selector 13 may output, according to a selection instruction, the video image generated by the normalization unit 121 corresponding to the selection instruction. Therefore, a user may input an instruction to the video processing device according to an actually desired display effect, so that the video image output from the video processing device meets the actual requirement.

In some embodiments, the image processor 14 includes: an image processing sub-circuit 141, an image analysis sub-circuit 142, a merger sub-circuit 143, and a direct output sub-circuit 144. The merger sub-circuit 143 has a first receiving end, a second receiving terminal, a third receiving terminal, and an output terminal. The first receiving terminal of the merger sub-circuit 143 is connected to the image processing sub-circuit 141, the second receiving terminal of the merger sub-circuit 143 is connected to the image analysis sub-circuit 142, the third receiving terminal of the merger sub-circuit 143 is connected to the direct output sub-circuit 144, and the output terminal of the merger sub-circuit 143 is connected to the display 20.

The image processing sub-circuit 141 is configured to perform image processing on the received video image to generate an optimized video image with a target resolution, and output the optimized video image to the first receiving terminal of the merger sub-circuit 143.

In some examples, the image processing performed by the image processing sub-circuit 141 may include processings such as image enhancement, image sharpening, image denoising and the like, which makes the video image visually clearer; and the image processings may further include: adjusting an overall tone of the video image so that the video image has a more vivid color visually or has a higher contrast.

In other examples, the image processing sub-circuit 141 may further detect brightness of external ambient light, and perform image processing on the received video image according to the detected brightness of the external ambient light. For example, when the detected brightness of the external ambient light is lower, brightness of the received video image is reduced; and when the detected brightness of the external ambient light is higher, brightness of the received video image is increased.

The image analysis sub-circuit 142 is configured to perform image analysis on the received video image to generate an analysis result image corresponding to an analysis result, and output the analysis result image to the second receiving terminal of the merger sub-circuit 143.

In some examples, the image analysis sub-circuit 142 is configured to analyze the video image according to the content, properties of the video image without changing information of the video image itself. For example, the image analysis sub-circuit 142 is configured to analyze brightness distribution of different areas of the video image. For another example, the image analysis sub-circuit 142 is configured to count the number of pixels in each gray level in the video image. For yet another example, the image analysis sub-circuit 142 is configured to make statistics on brightness of a plurality of pixels in a certain area of the video image. In some embodiments, the analysis result image generated by the image analysis sub-circuit 142 may include a histogram and/or a waveform diagram.

The direct output sub-circuit 144 is configured to directly output the received video image to the third receiving terminal of the merger sub-circuit 143.

The merger sub-circuit 143 is configured to splice the output images from the image processing sub-circuit 141 and the direct output sub-circuit 144, and superimpose the spliced image with the output image from the image analysis sub-circuit 142 to generate the image to be displayed. It should be noted that when only one of the image processing sub-circuit 141 and the direct output sub-circuit 144 outputs a video image, the video image is directly used as the spliced image. When the image analysis sub-circuit 142 outputs no image, the spliced image is directly used as the image to be displayed.

In some embodiments, the selection instruction may include: an optimization selection instruction, an analysis selection instruction and a direct output selection instruction. Multiple types of optimization selection instructions may be included. For example, the optimization selection instruction includes a first optimization selection instruction and a second optimization selection instruction, each of which may correspond to one or more normalization sub-circuits 121. The selector 13 is specifically configured to: output, in response to the optimization selection instruction, the video image generated by a corresponding normalization sub-circuit 121 to the image processing sub-circuit 141; and output, in response to the analysis selection instruction, the video image generated by a corresponding normalization sub-circuit 121 to the image analysis sub-circuit 142; and output, in response to the direct output selection instruction, the video image generated by a corresponding normalization sub-circuit 121 to the direct output sub-circuit 144.

For example, when the selector 13 receives the first optimization selection instruction, the normalization sub-circuit 121 corresponding to the first optimization selection instruction is determined according to a first mapping table, and the video image output from the normalization sub-circuit 121 is output to the image processing sub-circuit 141 for optimization processing. When the selector 13 receives the analysis selection instruction, the video image generated by a normalization sub-circuit 121 corresponding to the analysis selection instruction is output to the image analysis sub-circuit 142 for image analysis. When the selector 13 receives the direct output selection instruction, the video image generated by a normalization sub-circuit 121 corresponding to the direct output selection instruction is output to the direct output sub-circuit 144, and thus is directly output to the merger sub-circuit 143. The first mapping table may include a correspondence relationship between a plurality of optimization selection instructions and a plurality of normalization sub-circuits 121, and the second optimization selection instruction and the third optimization selection instruction may each correspond to one of the normalization sub-circuits.

The embodiment of the present disclosure takes the case where the format adjustment performed by the normalization sub-circuits includes resolution adjustment as an example for illustration, and accordingly, the target format includes a target resolution. A resolution of the original video image is smaller than the target resolution. The resolution of the original video image is determined by performance of the image capture device itself, and the target resolution is related to performance parameters of the display 20. In some embodiments, the normalization processor 12 may further include a computation sub-circuit configured to: compute the target resolution based on the received selection instruction and a parameter of the display 20. The parameter of the display 20 includes a resolution of the display 20. As described above, the selection instruction includes an optimization selection instruction and a direct output selection instruction. In this case, when the selector 13 receives one of the optimization selection instruction and the direct output selection instruction, if the optimization selection instruction or the direct output selection instruction received by the selector 13 corresponds to one normalization sub-circuit 121, it indicates that the user only needs to view an output result from the one normalization sub-circuit 121, and at this time, the computation sub-circuit takes the resolution of the display 20 as the target resolution. If the optimization selection instruction or the direct output selection instruction received by the selector 13 corresponds to a1 (where the number a1>1) normalization sub-circuits 121, it indicates that the user needs to view and compare output results from a plurality of normalization sub-circuits 121, and at this time, the computation sub-circuit determines the target resolution according to the resolution of the display 20 and the number a1. When the selector 13 receives both the optimization selection instruction and the direct output selection instruction at the same time, if the optimization selection instruction and the direct output selection instruction received by the selector 13 correspond to a total number of a2 (where the number a2>1) normalization sub-circuits 121, then the computation sub-circuit determines the target resolution according to the resolution of the display 20 and the number a2.

For example, the resolution of the original video image is 640×480, and the resolution of the display 20 (i.e., the resolution of the image to be displayed) is 4K (specifically 4096×2160). When the selector 13 receives the first optimization selection instruction but not the direct output selection instruction, and the first optimization selection instruction corresponds to one of the normalization sub-circuits 121, the target resolution may be 4096×2160; when the selector 13 receives both the first optimization selection instruction and the direct output selection instruction, the target resolution may be 2048×2160. For another example, the resolution of the original video image is 640×480, and the resolution of the display 20 (i.e., the resolution of the image to be displayed) is 8K (specifically 7680×4320). When the video processing device receives both the first optimization selection instruction and the direct output selection instruction, the target resolution may be 3840×4320.

In some embodiments, the plurality of normalization sub-circuits 121 of the normalization processor 12 include: an interpolation amplification normalization sub-circuit 121*a*, a boundary filling normalization sub-circuit 121*b*, and a pixel replicate normalization sub-circuit 121*c*.

Figure 2:
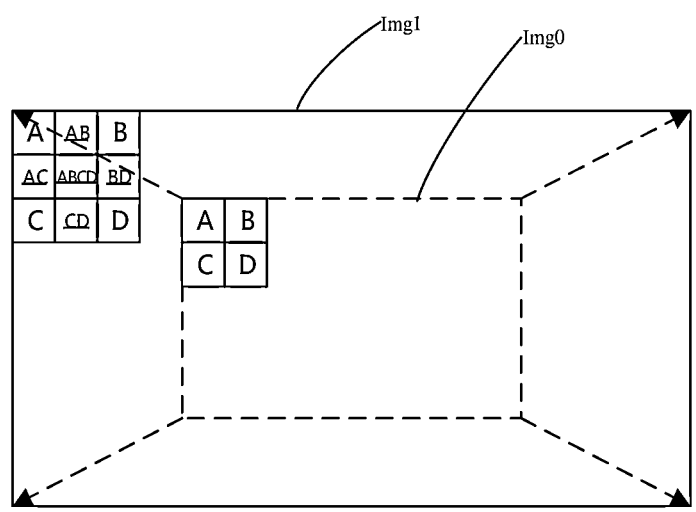
FIG. 2 is a schematic diagram of a first video image generated by an interpolation amplification normalization sub-circuit according to an embodiment of the present disclosure.

The interpolation amplification normalization sub-circuit 121*a* is configured to perform resolution adjustment on the original video image in an interpolation manner to obtain a first video image with the target resolution. For example, the interpolation manner may include a conventional bilinear interpolation, bicubic interpolation, or wavelet interpolation, or may include an interpolation algorithm using a neural network technology, or the like. The interpolation algorithm tends to obtain an amplified image of high definition, smoothness and texture details, as well as a better visual effect. When the interpolation amplification normalization sub-circuit performs resolution adjustment, a resolution improvement multiple may be first determined according to the resolution of the original video image and the target resolution, and then the resolution improvement may be performed on the original video image according to the resolution improvement multiple. FIG. 2 is a schematic diagram of a first video image generated by an interpolation amplification normalization sub-circuit according to an embodiment of the present disclosure. As shown in FIG. 2, taking each pixel in the original video image as an original pixel, the interpolation amplification normalization sub-circuit 121*a* inserts a new pixel between every two adjacent pixels, where a pixel value of the new pixel is determined from pixel values of the adjacent original pixels. For example, pixel values of a pixel A in 1st row and 1st column, a pixel B in 1st row and 2nd column, a pixel C in 2nd row and 1st column, and a pixel D in 2nd row and 2nd column of the original video image are respectively pixel values of a pixel in 1st row and 1st column, a pixel in 1st row and 3rd column, a pixel in 3rd row and 1st column, and a pixel in 3rd row and 3rd column of the first video image. In turn, the pixel value of the pixel in the 2nd row and 2nd column of the first video image is obtained from the pixel values of the pixel A and the pixel B in the original video image; the pixel value of the pixel in the 2nd row and 1st column of the first video image is obtained from the pixel values of the pixel A and the pixel C in the original video image; the pixel value of the pixel in the 2nd row and 2nd column of the first video image is obtained from the pixel values of the pixel A, the pixel B, the pixel C and the pixel D in the original video image; the pixel value of the pixel in the 2nd row and 3rd column of the first video image is obtained from the pixel values of the pixel B and the pixel D in the original video image; the pixel value of the pixel in the 3rd row and 2nd column of the first video image is obtained from the pixel values of the pixel C and the pixel D in the original video image; so on and so forth.

Figure 3:
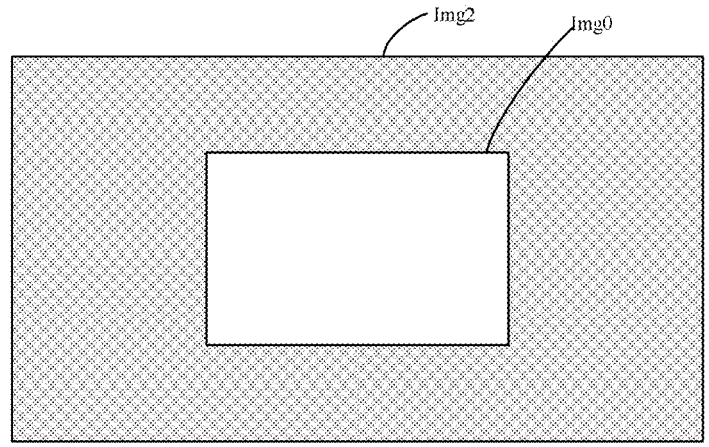
FIG. 3 is a schematic diagram of a second video image generated by a boundary filling normalization unit according to an embodiment of the present disclosure.

FIG. 3 is a schematic diagram of a second video image generated by a boundary filling normalization unit according to an embodiment of the present disclosure. As shown in FIG. 3, the boundary filling normalization sub-circuit 121*b* is configured to fill the periphery of the original video image Img0 with pixels of a first color in a boundary filling manner to obtain a second video image Img2 with the target resolution. The boundary filling normalization sub-circuit 121*b* may firstly determine, according to the resolution of the original video image and the target resolution, positions of the pixels of the first color in the second video image, and then perform boundary filling to obtain the second video image.

In some embodiments, the first color may be a preset color, such as black, or white or other colors.

In other embodiments, the boundary filling normalization sub-circuit 121*b* may determine the first color according to the color of each pixel in the original video image. For example, the first color is set to a color that is greatly different from an average color of the pixels to highlight the content of the original video image. The pixel value of each pixel includes gray levels of a plurality of primary color (e.g., red, green, and blue) components, and the color of each pixel is determined by the gray levels of the plurality of primary color components. The average color of pixels in the original video image may be regarded as a color determined by an average gray level value of red components of the pixels, an average gray level value of green components of the pixels, and an average gray level value of blue components of the pixels. In an example, the average gray level value of the red components of the pixels in the original video image is 10, the average gray level value of the green components of the pixels is 20, and the average gray level value of the blue components of the pixels is 200. As a result, the gray levels of the red component, the green component, and the blue component of the pixels of the first color may be: 255, 255 and 0, respectively. For another example, when 50% or more of the pixels in the original video image have a reference color or a color approximately the reference color, the first color is set to a color that is greatly different from the reference color.

The pixel replicate normalization sub-circuit 121c is configured to process the original video image in a pixel replicate manner to obtain a third video image with the target resolution, when the resolution of the original video image is M1×N1 (i.e., the original video image includes N1 rows and M1 columns of pixels) and the target resolution is M2×N2 and if M2/M1=N2/N1=i, where i is an integer greater than 1. The third video image includes N1 rows and M1 columns of pixel groups each including i rows and i columns of pixels, and a plurality of pixels of a pixel group in an $n^{th}$ row and an $m^{th}$ column are obtained by replicating a pixel in an $n^{th}$ row and an $m^{th}$ column of the original video image, where 1≤n≤N1 and 1≤m≤M1.

It should be noted that the expression "a plurality of pixels of a pixel group in an $n^{th}$ row and an $m^{th}$ column are obtained by replicating a pixel in an $n^{th}$ row and an $m^{th}$ column of the original video image" means that the plurality of pixels of the pixel group in the $n^{th}$ row and the $m^{th}$ column each have the same color information as the pixel in the $n^{th}$ row and the $m^{th}$ column of the original video image.

Figure 4:
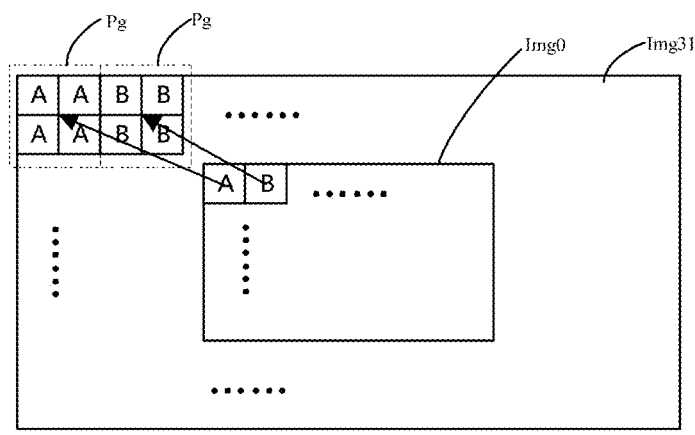
FIG. 4 is a schematic diagram showing a pixel replicate normalization unit generating the third video image according to an embodiment of the present disclosure.
Figure 4:
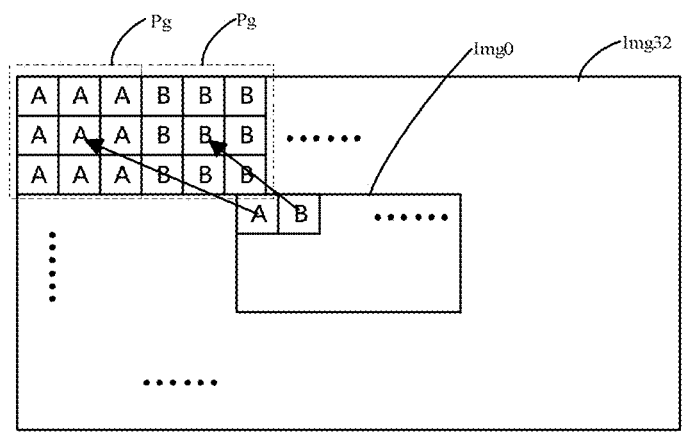

FIG. 4 is a schematic diagram showing a pixel replicate normalization sub-circuit generating the third video image according to an embodiment of the present disclosure. For example, when M1=1920, N1=1080, M2=3840, and N2=2160, that is, when the target resolution is 3840×2160 and the resolution of the original video image Img0 is 1920×1080, it may be determined that the third video image Img31 includes 1080 rows and 1920 columns of pixel groups, and since i=3840/1920=2160/1080=2, each pixel group Pg in the third video image Img31 includes 2 rows and 2 columns of pixels, as shown in FIG. 4. Among them, 4 pixels of the pixel group Pg in the 1st row and the 1st column are each obtained by replicating the pixel A in 1st row and 1st column of the original video image Img0, and 4 pixels of the pixel group Pg in the 1st row and the 2nd column of the third video image Img31 are each obtained by replicating the pixel B in 1st row and 2nd column of the original video image Img0. For another example, when M1=1280, N1=960, M2=3840, N2=2160, that is, when the target resolution is 3840×2160 and the resolution of the original video image Img0 is 1280×720, it may be determined that the third video image Img31 includes 1280 rows and 720 columns of pixel groups, and since i=3840/1280=2160/720=3, each pixel group Pg in the third video image Img32 includes 3 rows and 3 columns of pixels, as shown in FIG. 4. Among them, 9 pixels of the pixel group Pg in the 1st row and the 1st column are each obtained by replicating the pixel A in 1st row and 1st column of the original video image Img0, and 9 pixels of the pixel group Pg in the 1st row and the 2nd column of the third video image Img32 are each obtained by replicating the pixel B in 1st row and 2nd column of the original video image Img0.

When the resolution of the original video image Img0 is M1×N1 and the target resolution is M2×N2, the pixel replicate normalization sub-circuit 121c is further configured to, if M2/M1≠N2/N1, or at least one of M2/M1 or N2/N1 is a non-integer, process the original video image in the pixel replicate manner and the boundary filling manner to obtain a fourth video image with the target resolution. The fourth video image includes a primary image area and a filled area. The primary image area includes N1 rows and M1 columns of pixel groups each including j rows and j columns of pixels, and a plurality of pixels of a pixel group in an $n^{th}$ row and an $m^{th}$ column are obtained by replicating the pixel in the $n^{th}$ row and the $m^{th}$ column of the original video image; and each pixel in the filled area is a pixel of a second color; where j≤(M2/M1, N2/N1), and j is an integer.

Figure 5:
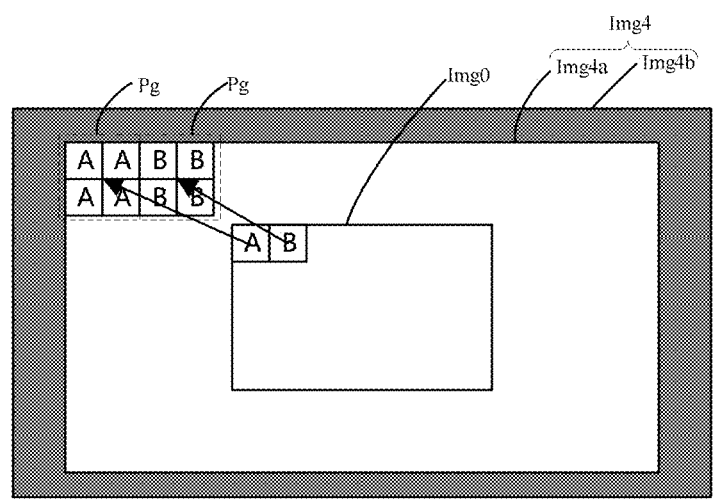
FIG. 5 is a schematic diagram showing a pixel replicate normalization unit generating the fourth video image according to an embodiment of the present disclosure.

FIG. 5 is a schematic diagram showing a pixel replicate normalization sub-circuit generating the fourth video image according to an embodiment of the present disclosure. For example, when M1=1280, N1=960, M2=3840, N2=2160, that is, when the target resolution is 3840×2160 and the resolution of the original video image Img0 is 1280×960, the fourth video image includes 960 rows and 1280 columns of pixel groups, and min(M2/M1, N2/N1)=2. Therefore, j may be set to 2, that is, each pixel in the original video image Img0 is replicated to 2×2 pixels, thereby obtaining a primary image area Img4a of the fourth video image Img4. In addition, the periphery of the primary image area Img4a is filled with pixels of the second color as a filled area Img4b of the fourth video image Img4. As shown in FIG. 5, each pixel group Pg in the primary image area Img4a of the fourth video image Img4 includes 2 rows and 2 columns of pixels, 4 pixels of the pixel group Pg in the 1st row and the 1st column of the primary image area Img4a are each obtained by replicating the pixel A in 1st row and 1st column of the original video image Img0, and 4 pixels of the pixel group Pg in the 1st row and the 2nd column of the primary image area Img4a are each obtained by replicating the pixel B in 1st row and 2nd column of the original video image Img0.

In some embodiments, the second color may be a preset color, such as black, or white or other colors. In other embodiments, the pixel replicate normalization sub-circuit may determine the second color according to the color of each pixel in the original video image, which may specifically refer to the above determination manner of the first color, and thus is not repeated here.

In some examples, the normalization sub-circuit 121 corresponding to the analysis selection instruction may be the boundary filling normalization sub-circuit 121b or the pixel replicate normalization sub-circuit 121c. The boundary filling normalization sub-circuit 121b is further configured to mark the pixels of the first color value filled at the periphery of the original video image Img0. The pixel replicate normalization sub-circuit 121c is further configured to mark each pixel in an edge area Img4b of the fourth video image Img4. In this manner, the image analysis sub-circuit 142 can easily identify which pixels in the received image are pixels of the original video image Img0, so as to perform precise analysis on the original video image Img0. In addition, the image processing sub-circuit 141 and the image analysis sub-circuit 142 can both screen the desired pixels for processing according to markers of the pixels, thereby reducing the computational complexity and the resource consumption.

In some embodiments, the image analysis sub-circuit 142 includes: a judgment unit and an analysis unit. The judgment unit is configured to judge, according to markers of pixels in the video image received by the image analysis sub-circuit, whether each pixel in the received video image is an original pixel in the original video image, and take the pixel as an effective pixel if a pixel in the received video image is determined to be an original pixel in the original video image. The analysis unit is configured to perform, according to data of each effective pixel, image analysis on the video image received by the image analysis sub-circuit 142.

It should be noted that the above case where the normalization processor 12 includes an interpolation amplification normalization sub-circuit 121a, a boundary filling normalization sub-circuit 121b, and a pixel replicate normalization sub-circuit 121c is merely taken as an example for illustration, and the normalization processor 12 may further include other normalization sub-circuits, such as a tile normalization sub-circuit, which is configured to replicate the original video image into z rows and z columns constituting a fifth video image with the target resolution, when the resolution of the original video image is M1×N1 and the target resolution is M2×N2 and M2/M1=N2/N1=z, where z is an integer greater than 1.

In some embodiments, as shown in FIG. 1, the video processing device further includes a clock generator 16 configured to output a first clock signal to the receiver 11 and a second clock signal to each of the normalization sub-circuits 121. The first clock signal and the second clock signal serve as excitation signals for the receiver 11 and each normalization sub-circuit 121, respectively. The receiver 11 is configured to output, under excitation of the first clock signal, image data of the original video image to the normalization processor 12; and each normalization sub-circuit 121 is configured to output, under excitation of the second clock signal, image data of the video image with the target resolution. The normalization sub-circuits 121 each output data of images in a same resolution format under the excitation of the first clock signal, and therefore, the data output by the normalization sub-circuits 121 is uniform in structure. As a result, the image processing sub-circuit 141 and the image analysis sub-circuit 142 can use a same data input interface without any compatible design inside, and the image processing sub-circuit 141 (or the image analysis sub-circuit 142) can flexibly process the video image with different algorithms without any additional data conversion, thereby reducing the resource consumption.

It should be understood that, in the embodiments of the present disclosure, the images transmitted between the devices or sub-circuits are not visual images, but data capable of representing the image information. When the image has a higher resolution, the amount of data transmitted per unit time also increases. In order to match a video play speed of the display 20 with a speed at which the video capture device captures video images, in some examples, the first clock signal has a clock frequency lower than the second clock signal, the receiver 11 outputs color information of "a" (e.g., the number "a" is 1) pixel(s) in each clock cycle of the first clock signal, and the normalization sub-circuit 121 outputs color information of "b" (e.g., the number "b" is greater than or equal to "a") pixel(s) in each clock cycle of the second clock signal.

In some embodiments, as shown in FIG. 1, the video processing device further includes: a buffer 15 connected to each of the normalization sub-circuits 121 and configured to perform data buffering and data synchronization on the images generated by the normalization sub-circuits 121, and transmit the synchronized data to a corresponding normalization sub-circuit. In this manner, when the selector 13 outputs the video images output from the plurality of normalization sub-circuits 121 to the image processor, it is ensured that the image data of each path received by the image processor 14 are synchronized, thereby ensuring that the display can synchronize the video image output from the image processing sub-circuit and the analysis result output from the image analysis sub-circuit. The buffer 15 may include a double data rate SDRAM (DDR SDRAM).

Figure 6:
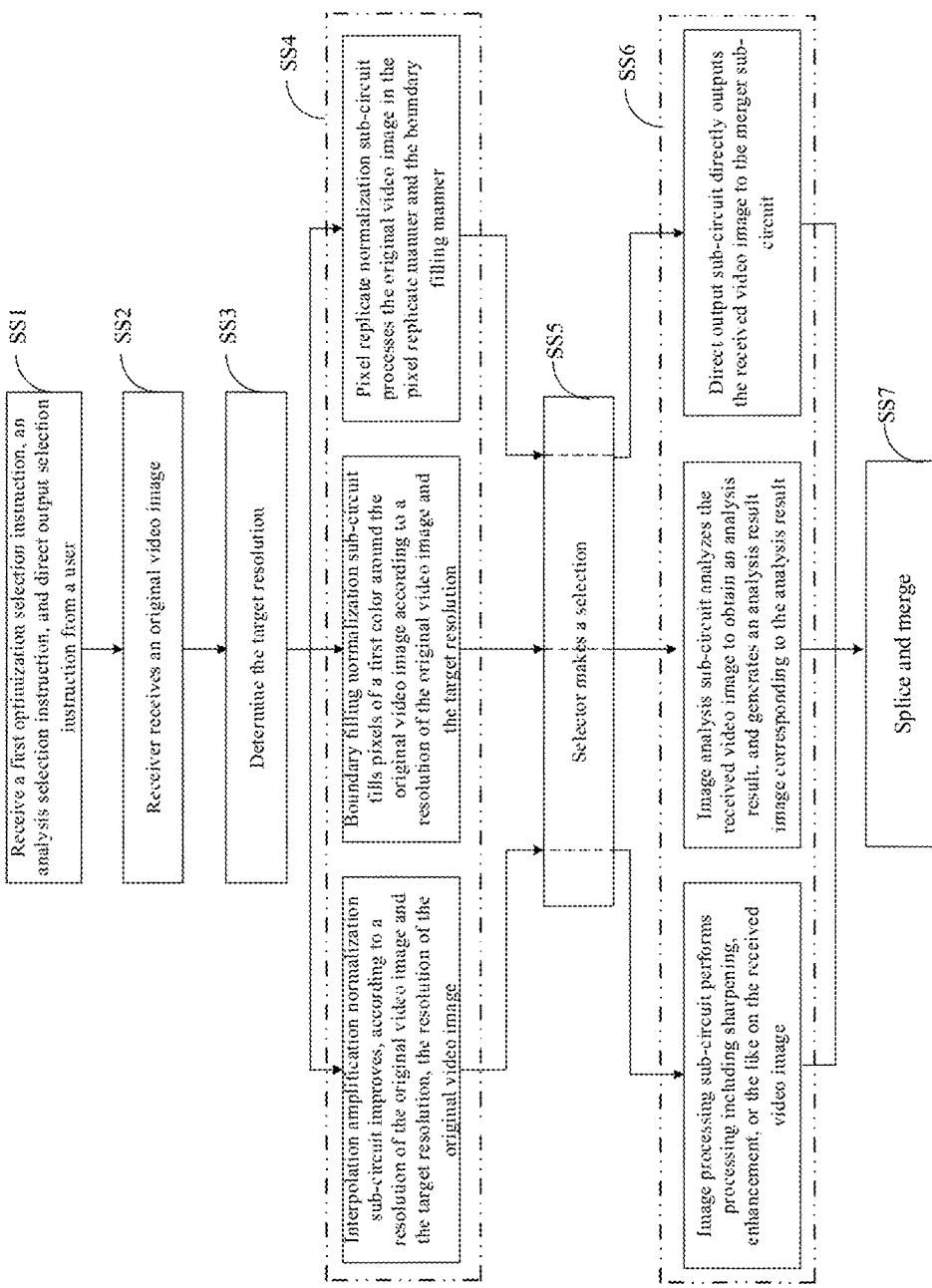
FIG. 6 is a diagram showing a specific example of the process of video processing according to an embodiment of the present disclosure.

FIG. 6 is a diagram showing a specific example of the process of video processing according to an embodiment of the present disclosure. As shown in FIG. 6, the process of video processing includes steps SS1 to SS8.

At SS1, a video processing device receives a first optimization selection instruction, an analysis selection instruction, and a direct output selection instruction from a user.

At SS2, a receiver receives an original video image. For example, a resolution of the original video image is 640×480.

At SS3, a computation sub-circuit determines, according to a mapping table, that the first optimization selection instruction corresponds to one of the normalization sub-circuits, and the direct output selection instruction corresponds to one of the normalization sub-circuits. At this time, the computation sub-circuit determines the target resolution according to a total number of normalization sub-circuits corresponding to the first optimization selection instruction and the direct output selection instruction, and a parameter of a display. For example, the parameter of the display includes a resolution of the display, and the resolution of the display is 4096×2160, so the target resolution may be 2048×2160.

At SS4, an interpolation amplification normalization sub-circuit improves, according to a resolution of the original video image and the target resolution, the resolution of the original video image to obtain a first video image with the target resolution.

A boundary filling normalization sub-circuit fills, according to a resolution of the original video image and the target resolution, the periphery of the original video image with pixels of a first color to obtain a second video image with the target resolution.

A pixel replicate normalization sub-circuit processes the original video image in the pixel replicate manner and the boundary filling manner to obtain a fourth video image the target resolution. The specific obtaining method of the fourth video image has been described above and thus is not repeated here.

At SS5, a selector makes a selection. Specifically, the selector determines, according to the mapping table, that the normalization sub-circuit corresponding to the first optimization selection instruction is an interpolation amplification normalization sub-circuit, the normalization sub-circuit corresponding to the direct output selection instruction is a pixel replicate normalization sub-circuit, and the normalization sub-circuit corresponding to the analysis selection instruction is a boundary filling normalization sub-circuit. At this time, the selector outputs an output result of the interpolation amplification normalization sub-circuit to the image processing sub-circuit; outputs an output result of the boundary filling normalization sub-circuit to the image analysis sub-circuit; and outputs an output result of the pixel replicate normalization sub-circuit to the direct output sub-circuit.

At SS6, the image processing sub-circuit performs processings including sharpening, enhancement, and the like on the received video image, and outputs the processed video image to the merger sub-circuit; the image analysis sub-circuit analyzes the received video image to obtain an analysis result, and generates an analysis result image corresponding to the analysis result, such as a histogram or a waveform diagram; and the direct output sub-circuit directly outputs the received video image to the merger sub-circuit.

At SS7, the merger sub-circuit splices the output results from the image processing sub-circuit and the direct output sub-circuit, and superimposes the spliced image with the analysis result image output from the image analysis sub-circuit to generate an image to be displayed.

At SS8, the image to be displayed is output to a display for displaying.

Figure 7:
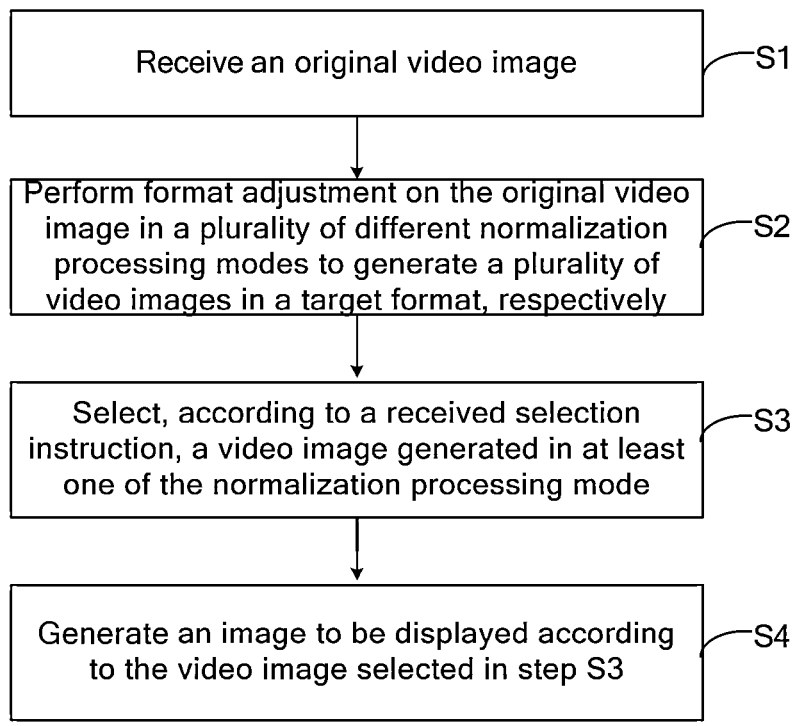
FIG. 7 is a flowchart of a video processing method according to an embodiment of the present disclosure.

FIG. 7 is a flowchart of a video processing method according to an embodiment of the present disclosure, which is implemented by the above video processing device. As shown in FIG. 7, the video processing method includes steps S1 to S4.

At step S1, an original video image is received.

At step S2, format adjustment is performed on the original video image in a plurality of different normalization processing modes to generate a plurality of video images in a target format, respectively.

At step S3, according to a received selection instruction, a video image generated in at least one of the normalization processing mode is selected. The video image(s) generated by which normalization processing method(s) is/are selected may be determined according to the received selection instruction.

At step S4, an image to be displayed is generated according to the video image selected in step S3.

Figure 8:
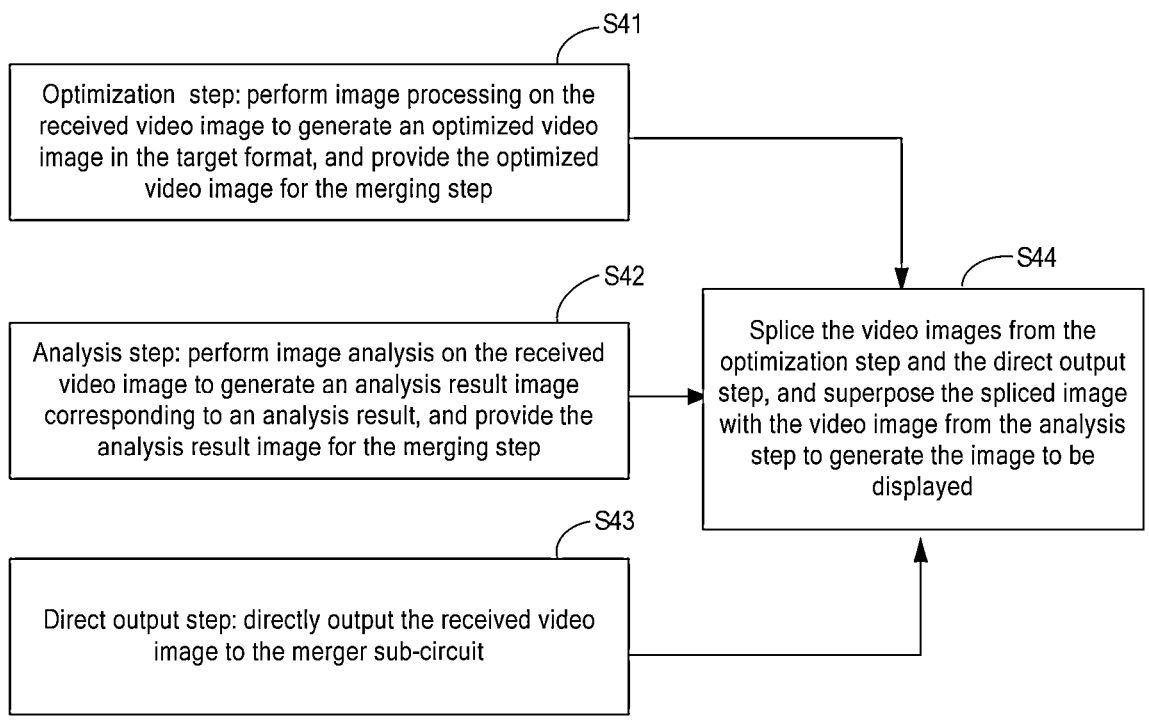
FIG. 8 is a flowchart of an optional manner in step S4 according to an embodiment of the present disclosure.

FIG. 8 is a flowchart of an alternative manner in step S4 according to an embodiment of the present disclosure. As shown in FIG. 8, step S4 includes: an optimization step (S41), an analysis step (S42), a direct output step (S43), and a merging step (S44).

The optimization step includes: performing image processing on the received video image to generate an optimized video image in the target format, and providing the optimized video image for the merging step.

The analysis step includes: performing image analysis on the received video image to generate an analysis result image corresponding to an analysis result, and providing the analysis result image for the merging step.

The direct output step includes: directly outputting the received video image to the merger sub-circuit.

The merging step includes: splicing the video images from the optimization step and the direct output step, and superposing the spliced image with the video image from the analysis step to generate the image to be displayed.

The selection instruction includes an optimization selection instruction, an analysis selection instruction and a direct output selection instruction. Step S3 includes: providing, in response to the optimization selection instruction, the video image generated by a corresponding normalization sub-circuit for the image to be processed in the optimization step; and providing, in response to the analysis selection instruction, the video image generated by a corresponding normalization sub-circuit for the analysis step; and providing, in response to the direct output selection instruction, the video image generated by a corresponding normalization sub-circuit for the direct output step.

In some embodiments, the format adjustment includes resolution adjustment, the target format includes a target resolution, and a resolution of the original video image is smaller than the target resolution. The resolution of the original video image is smaller than the target resolution. Before step S2, the method further includes: computing the target resolution based on the received selection instruction and a parameter of a display. The parameter of the display includes a resolution of the display.

The plurality of different normalization processing modes include: a first normalization processing mode, a second normalization processing mode and a third normalization processing mode.

The first normalization processing mode includes: performing resolution adjustment on the original video image in an interpolation manner to obtain a first video image with the target resolution.

The second normalization processing mode includes: filling the original video image with pixels of a first preset color in a boundary filling manner to obtain a second video image with the target resolution.

The third normalization processing mode includes: when the resolution of the original video image is M1×N1 and the target resolution is M2×N2 and if M2/M1=N2/N1=i, where i is an integer greater than 1, processing the original video image in a pixel replicate manner to obtain a third video image with the target resolution. The third video image includes N1 rows and M1 columns of pixel groups each including i rows and i columns of pixels, and a plurality of pixels of a pixel group in an $n^{th}$ row and an $m^{th}$ column are obtained by replicating the pixel in an $n^{th}$ row and an $m^{th}$ column of the original video image, where $1 \leq n \leq N1$ and $1 \leq m \leq M1$. If M2/M1≠N2/N1, or at least one of M2/M1 or N2/N1 is a non-integer, the original video image is processed in the pixel replicate manner and the boundary filling manner to obtain a fourth video image with the target resolution. The fourth video image includes a primary image area and a filled area. The primary image area includes N1 rows and M1 columns of pixel groups each including j rows and j columns of pixels, and a plurality of pixels of a pixel group in an $n^{th}$ row and an $m^{th}$ column are obtained by replicating the pixel in the $n^{th}$ row and the $m^{th}$ column of the original video image; and each pixel in the filled area is a pixel of a second color; where j≤min(M2/M1, N2/N1), and j is an integer.

In some embodiments, the second normalization processing mode further includes: marking the pixels of the first color value filled at the periphery of the original video image. The third normalization processing mode further includes: marking each pixel in the filled area of the fourth video image. In the analysis step, performing image analysis on the received video image includes: judging, according to markers of pixels in the received video image, whether each pixel in the received video image is an original pixel in the original video image, and taking, if a pixel in the received video image is an original pixel in the original video image, the pixel as an effective pixel; and then performing, according to data of each effective pixel, image analysis on the received video image.

For the process of video image processing, reference may be made to description in the above embodiments, which is not repeated here.

An embodiment of the present disclosure further provides a monitor apparatus, including: a display and the video processing device as described above. The display is configured to display according to an image to be displayed output from the video processing device.

An embodiment of the present disclosure further provides a computer device, including a memory and a processor. The memory has a computer program stored thereon which, when executed by the processor, causes the above video processing method to be implemented.

An embodiment of the present disclosure further provides a computer-readable storage medium having a computer program stored thereon which, when executed by a processor, causes the above video processing method to be implemented. The computer-readable storage medium includes, but is not limited to, the following readable media: a random access memory (RAM), a read only memory (ROM), a non-volatile random access memory (NVRAM), a programmable read only memory (PROM), an erasable programmable read only memory (EPROM), an electrically erasable programmable read only memory (EEPROM), a flash memory, a magnetic or optical data memory, a register, a magnetic disc or tape, an optical storage medium such as a compact disc (CD) or a DVD (digital versatile disc), and other nontransitory media. Examples of the processor include, but are not limited to, general purpose processors, central processing units (CPUs), microprocessors, digital signal processors (DSPs), controllers, microcontrollers, state machines, and the like.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A video processing device, comprising: a receiver, a normalization processor, a selector and an image processor; wherein the receiver is connected to the normalization processor, the normalization processor is connected to the selector, and the selector is connected to the image processor;

the receiver is configured to receive an original video image;

the normalization processor comprises a plurality of normalization sub-circuits each configured to perform format adjustment on the original video image to generate a video image in a target format, wherein different ones of the normalization sub-circuits perform the format adjustment in different manners;

the selector is configured to output the video image generated by at least one of the normalization sub-circuits to the image processor according to a received selection instruction; and the image processor is configured to generate an image to be displayed from the received video image, wherein the image processor comprises an image processing sub-circuit, a direct output sub-circuit, and a merger sub-circuit, and the image processing sub-circuit and the direct output sub-circuit are each connected to the merger sub-circuit, the image processing sub-circuit is configured to perform image processing on the received video image to generate an optimized video image in a target format, and output the optimized video image to the merger sub-circuit, the direct output sub-circuit is configured to directly output the received video image to the merger sub-circuit, and the merger sub-circuit is configured to splice the images output from the image processing sub-circuit and the direct output sub-circuit.

2. The video processing device according to claim 1, wherein the image processor further comprises an image analysis sub-circuit, and the image analysis sub-circuit is connected to the merger sub-circuit;

the image analysis sub-circuit is configured to perform image analysis on the received video image to generate an analysis result image corresponding to an analysis result, and output the analysis result image to the merger sub-circuit;

the merger sub-circuit is further configured to superimpose the spliced image with the image output from the image analysis sub-circuit to generate the image to be displayed;

wherein the selection instruction comprises an optimization selection instruction, an analysis selection instruction and a direct output selection instruction, and the selector is configured to output, in response to the optimization selection instruction, the video image generated by a corresponding one of the normalization sub-circuits to the image processing sub-circuit; and output, in response to the analysis selection instruction, the video image generated by a corresponding one of the normalization sub-circuits to the image analysis sub-circuit; and output, in response to the direct output selection instruction, the video image generated by a corresponding one of the normalization sub-circuits to the direct output sub-circuit.

3. The video processing device according to claim 1, wherein the format adjustment performed on the original video image by the normalization sub-circuits comprises resolution adjustment, and the target format comprises a target resolution;

the normalization processor further comprises a computation sub-circuit configured to compute the target resolution based on the received selection instruction and a parameter of a display; and a resolution of the original video image is smaller than the target resolution; and the plurality of normalization sub-circuits of the normalization processor comprise:

an interpolation amplification normalization sub-circuit configured to perform resolution adjustment on the original video image in an interpolation manner to obtain a first video image with the target resolution;

a boundary filling normalization sub-circuit configured to fill a periphery of the original video image with pixels of a first color in a boundary filling manner to obtain a second video image of the target resolution; and a pixel replicate normalization sub-circuit configured to, when the resolution of the original video image is M1×N1 and the target resolution is M2×N2 and if M2/M1=N2/N1=i, process the original video image in a pixel replicate manner to obtain a third video image of the target resolution, where i is an integer greater than 1; wherein the third video image comprises N1 rows and M1 columns of pixel groups each comprising i rows and i columns of pixels, and a plurality of pixels of a pixel group in an $n^{th}$ row and an $m^{th}$ column are obtained by replicating a pixel in an $n^{th}$ row and an $m^{th}$ column of the original video image, where $1 \leq n \leq N1$ and $1 \leq m \leq M1$.

4. The video processing device according to claim 3, wherein the pixel replicate normalization sub-circuit is further configured to, if M2/M1≠N2/N1 or at least one of M2/M1 or N2/N1 is a non-integer, process the original video image in the pixel replicate manner and the boundary filling manner to obtain a fourth video image with the target resolution;

wherein the fourth video image comprises a primary image area and a filled area, the primary image area comprises N1 rows and M1 columns of pixel groups each comprising j rows and j columns of pixels, and a plurality of pixels of a pixel group in an $n^{th}$ row and an $m^{th}$ column are obtained by replicating the pixel in the $n^{th}$ row and the $m^{th}$ column of the original video image; and each pixel in the filled area is a pixel of a second color; where j≤min (M2/M1, N2/N1), and j is an integer.

5. The video processing device according to claim 4, wherein the boundary filling normalization unit is further configured to mark the pixels of the first color with which the periphery of the original video image is filled;

the pixel replicate normalization unit is further configured to mark each pixel in the filled area of the fourth video image; and the image analysis sub-circuit comprises: a judgment unit and an analysis unit, wherein the judgment unit is configured to judge, according to markers of pixels in the video image received by the image analysis sub-circuit, whether each pixel in the received video image is an original pixel in the original video image, and take a pixel in the received video image as an effective pixel if it is judged that the pixel in the received video image is an original pixel in the original video image; and the analysis unit is configured to perform, according to data of each effective pixel, image analysis on the video image received by the image analysis sub-circuit.

6. The video processing device according to claim 1, wherein the video processing device further comprises: a clock generator configured to output a first clock signal to the receiver and a second clock signal to each of the normalization sub-circuits;

wherein the receiver is configured to output, under excitation of the first clock signal, image data of the original video image to the normalization processor; and each normalization sub-circuit is configured to output, under excitation of the second clock signal, image data of the video image with the target resolution.

7. The video processing device according to claim 1, wherein the video processing device further comprises:

a buffer connected to each of the normalization sub-circuits and configured to perform data buffering and data synchronization on the video images generated by a plurality of the normalization sub-circuits, and transmit the synchronized data to a corresponding one of the normalization sub-circuits.

8. A video processing method, comprising:

receiving an original video image;

performing format adjustment on the original video image in a plurality of different normalization processing modes to generate a plurality of video images in a target format, respectively;

selecting, according to a received selection instruction, a video image generated in at least one of the normalization processing mode; and generating an image to be displayed according to the selected video image, wherein the generating the image to be displayed according to the selected video image comprises an optimization step, a direct output step and a merging step, the optimization step comprises: performing image processing on the received video image to generate an optimized video image in the target format, and providing the optimized video image for the merging step, the direct output step comprises: directly outputting the received video image to the merging step, and the merging step comprises: splicing the video images from the optimization step and the direct output step.

9. The video processing method according to claim 8, wherein the generating the image to be displayed according to the selected video image further comprises an analysis step; wherein comprises: performing image analysis on the received video image to generate an analysis result image corresponding to a result of the analysis, and providing the analysis result image for the merging step;

the direct output step; and the merging step further comprises: superposing the spliced image with the video image from the analysis step to generate the image to be displayed;

wherein the selection instruction comprises an optimization selection instruction, an analysis selection instruction and a direct output selection instruction; and the selecting, according to the received selection instruction, the video image generated in at least one of the normalization processing mode comprises: providing, in response to the optimization selection instruction, the video image generated by a corresponding normalization sub-circuit for the image to be processed in the optimization step; and providing, in response to the analysis selection instruction, the video image generated by a corresponding normalization sub-circuit for the analysis step; and providing, in response to the direct output selection instruction, the video image generated by a corresponding normalization sub-circuit for the direct output step.

10. The video processing method according to claim 8, wherein the format adjustment comprises resolution adjustment, the target format comprises a target resolution, and the resolution of the original video image is smaller than the target resolution;

before performing format adjustment on the original video image in the plurality of different normalization processing modes, the method further comprises: computing the target resolution based on the received selection instruction and a parameter of a display; and the plurality of different normalization processing modes comprise:

a first normalization processing mode, comprising: performing resolution adjustment on the original video image in an interpolation manner to obtain a first video image with the target resolution;

a second normalization processing mode, comprising: filling a periphery of the original video image with pixels of a first color in a boundary filling manner to obtain a second video image of the target resolution; and a third normalization processing mode, comprising: when the resolution of the original video image is M1×N1 and the target resolution is M2×N2 and if M2/M1=N2/N1=i, processing the original video image in a pixel replicate manner to obtain a third video image of the target resolution, where i is an integer greater than 1; wherein the third video image comprises N1 rows and M1 columns of pixel groups each comprising i rows and i columns of pixels, and a plurality of pixels of a pixel group in an $n^{th}$ row and an $m^{th}$ column are obtained by replicating a pixel in an $n^{th}$ row and an $m^{th}$ column of the original video image, where $1 \leq n \leq N1$ and $1 \leq m \leq M1$.

11. The video processing method according to claim 10, wherein the third normalization processing mode further comprises: if $M2/M1 \neq N2/N1$ or at least one of $M2/M1$ or $N2/N1$ is a non-integer, processing the original video image in the pixel replicate manner and the boundary filling manner to obtain a fourth video image with the target resolution;

wherein the fourth video image comprises a primary image area and a filled area, the primary image area comprises N1 rows and M1 columns of pixel groups each comprising j rows and j columns of pixels, and a plurality of pixels of a pixel group in an $n^{th}$ row and an $m^{th}$ column are obtained by replicating the pixel in the $n^{th}$ row and the $m^{th}$ column of the original video image; and each pixel in the filled area is a pixel of a second color; where $j \leq \min(M2/M1, N2/N1)$, and j is an integer.

12. The video processing method according to claim 11, wherein the second normalization processing mode further comprises: marking the pixels of the first color with which the periphery of the original video image is filled;

the third normalization processing mode further comprises: marking each pixel in the filled area of the fourth video image; and the performing image analysis on the received video image comprises:

judging, according to markers of pixels in the received video image, whether each pixel in the received video image is an original pixel in the original video image, and taking a pixel in the received video image as an effective pixel if it is judged that the pixel in the received video image is an original pixel in the original video image; and performing, according to data of each effective pixel, image analysis on the received video image.

13. A monitor apparatus, comprising: a display and the video processing device according to claim 8, wherein the display is configured to perform display according to an image to be displayed output from the video processing device.

14. A computer device, comprising a memory and a processor, wherein the memory has a computer program stored thereon which, when executed by the processor, causes the video processing method according to claim 8 to be implemented.

* * * * *